Figure 1:
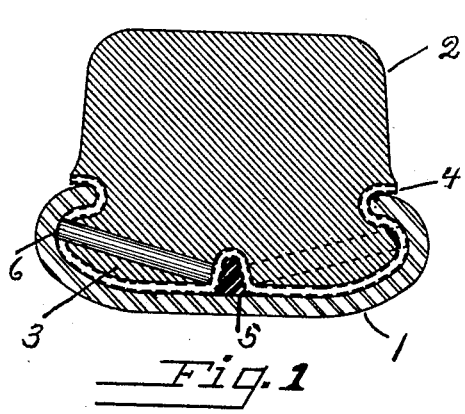

A. S. KROTZ.
VEHICLE WHEEL TIRE.
APPLICATION FILED MAY 19, 1915.

1,198,240.

Patented Sept. 12, 1916.

Witnesses
E. W. Boylen
Wm Sullivan

Inventor
Alvaro S. Krotz

UNITED STATES PATENT OFFICE.

ALVARO S. KROTZ, OF JANESVILLE, WISCONSIN.

VEHICLE-WHEEL TIRE.

1,198,240.  Specification of Letters Patent.  Patented Sept. 12, 1916.

Continuation of application Serial No. 721,205, filed September 19, 1912. This application filed May 19, 1915. Serial No. 29,053.

*To all whom it may concern:*

Be it known that I, ALVARO S. KROTZ, a citizen of the United States of America, and resident of Janesville, Rock county, Wisconsin, (care of Janesville Machine Company,) have invented a certain new and useful Improvement in Vehicle-Wheel Tires, of which the following is a specification.

This invention relates to improvements in rubber tires for vehicles, and the object thereof is to provide improved means for strengthening the fastening between the base portions thereof and providing an elastic or yielding fastening therefor.

My invention provides an elastic tire for vehicles, having a base portion adapted to be seated within a clencher shaped rim or channel, the base portion of the tire having a plurality of transversely extending wires and a central band, the wires being spaced alternately on opposite sides of the central band, the inner ends of these wires resting on the central band and extending at an upward angle and outward to and within the clencher portion of the rim, so that when the base or clencher portion of the rubber and the ends of the wires are compressed within the rim the central band yields to the pressure of the transverse wires. This yielding is sufficient to allow the base to be sprung into a rim having integral sides or clencher portions, but forces the transverse wires out and against the inner surface of the clencher, holding the base firmly in the rim independently of the expansion of the rubber. When the band is distorted an additional pressure is exerted against the transverse wires by the portion of the base which is compressed between the clencher portion of the rim and the central band. The use of this construction is also contemplated in a laterally compressible rim of the detachable flange type, or where there are separate side flanges held together by bolts.

In the process of manufacture there is considerable variation in widths of base and channel which variation is provided for by making the rubber base and the distance between the outside ends of opposite wires slightly wider than the rim. This insures a rigid fastening under all conditions.

The effect of the lateral pressure on the central band is to hold it tightly against the rim and insure against the central portion of the base becoming loose.

With the foregoing and other objects in view my invention consists in the novel combination of parts as hereinafter illustrated and described.

It is understood that the various forms of solid or built up clencher channels can be used with my invention and that numerous changes in shape and modifications in the arrangement of parts can be resorted to without departing from the scope of the claims hereunto appended.

Figure 3:
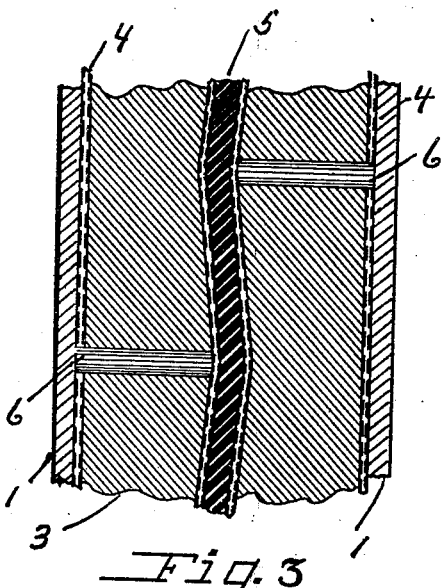
Figure 2:
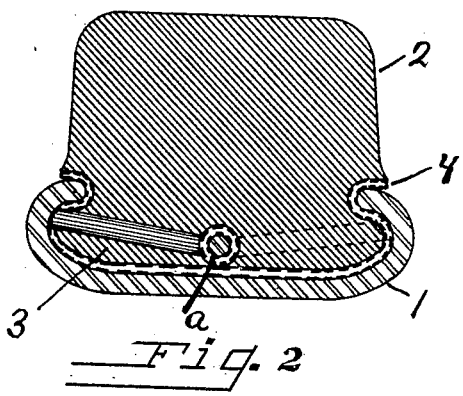
Figure 4:
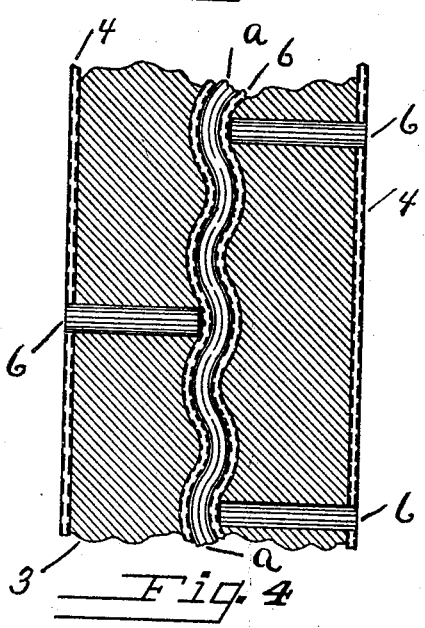

Referring to the accompanying drawings: Figure 1 is a transverse sectional view of my invention. Fig. 2 is a transverse sectional view of a modification. Fig. 3 is a sectional view of my invention on a line with the transverse wires and central band, showing the transverse wires in plan. Fig. 4 is a sectional view of the modification showing the band in the shape of a crimped wire and the transverse wires in plan.

Referring to the several drawings, 1 represents the clencher rim. Within this rim is seated an elastic tire 2, with a base portion 3. Embedded in the base 3, and preferably surrounded by the friction fabric 4 is the central band 5. This band can be made of any resilient material, preferably rubber of a vulcanizable compound which when cured will become considerably harder than the balance of the tire, or this band may be made of friction fabric layers of the shape shown or any other desired shape or thickness. In some cases a single fold of the fabric 4 might be desirable. The friction fabric 4 stiffens the base and firmly knits the central band 5 and base 3 together.

The cross wires 6 preferably have blunt ends and are spaced alternately on opposite sides of the bands 5 and $a$ as shown in Figs. 3 and 4, and they rest at an angle against the sloping sides of the central band 5 and under the hook or clencher portion of the rim 1 as indicated. It is obvious when the base 3 is compressed by being forced into the rim the central band 5 will be distorted, the central band having yielded enough to allow the base to be forced between and into the clencher portion of the rim and as the base is wider than the rim and the wires 6 preferably extend flush with the edge of the base the central band 5 will remain distorted and the compression of the base opposite the wire will press the ends of the wires into the rim after the base is seated in the rim, holding the whole base firmly and forcing the central band 5 into the bottom of the rim. The distortion of the central band is clearly shown in Fig. 3.

In the modification, shown in Figs. 2 and 4, I provide a crimped steel band $a$, which is embedded in the central portion of the base and preferably lying on the layer of friction fabric 4. The transverse wires 5 are located in the same manner as in Fig. 1. The steel band is crimped so as to make it more elastic to the extent of allowing the proper compression in forcing the base into the clencher rim. However, in some cases a straight steel band of the proper material would yield enough for this purpose. It would also yield to the pressure of the transverse wires by drawing closer to the base of the rim, especially if located with a slight amount of rubber between it and the base surface. In order to hold the inner ends of the transverse wires in position against the steel band $a$ and more firmly knit the band to the rubber, I preferably surround the band with the friction fabric $b$ as indicated.

In Fig. 3 the base is shown as compressed into position within the flanges of the channel. In Fig. 4 the base is shown in its normal condition before it is compressed. The band $b$ is therefore not shown distorted in Fig. 4.

Where laterally compressible clencher rims are used or where the clencher portion of the rims are made of separate flanges and held together by bolts a less degree of flexibility of the band is necessary, it only being necessary to provide for necessary compression between the flanges.

With further respect to the retaining band (such as $a$ or 5) by which the tire is held in place, and which is flexed or distorted at intervals along the length thereof by the endwise thrust of the wires 6 resulting from the inward pressure of the side flanges, it will be seen that a band of this character, so far as the broader purposes of my invention are concerned, may be composed of any suitable materials, and that for this as well as other reasons my invention is not limited to the exact construction shown and described.

The band or strip ($a$ or 5) is in the nature of a retaining member extending in a circle which is concentric with the tire and rim. When the tire is in place, the pressure of the flanges on the wires or other elements 6 causes a distortion of said member in such a manner that it tends to contract—that is to say, the circle thereof tends to become of less diameter, thereby tightening the member on the rim. When thus contracted or tightened by the zigzag distortion, the member tends always to assume its normal condition, and this tension serves to keep the sides of the tire under the flanges.

Whether the retaining band is straight or deflected from side to side in a zigzag fashion, when the tire is in the rim, depends upon the length of the wires 6 interposed between the band and the flanges of the rim. If these wires are of sufficient length, then the compression of the base portion of the tire within the rim, and the inward displacement of these wires, will distort the band and cause it to assume a zigzag form as long as the tire remains in the rim; and during the insertion and removal of the tire, requiring still further lateral compression of the base portion thereof, the distortion of the band will be increased. On the other hand, and if the wires 6 are somewhat shorter, then the retaining band will only be distorted during the insertion and removal of the tire, and when the latter is firmly seated in the rim the band will extend straight ahead between the two series of transverse wires. It follows, therefore, with the construction shown and described, that the retaining band is incorporated by vulcanization within the base of the tire, is primarily and at all times thereafter of a relatively hard material, and is subject to lateral distortion or deflection during insertion of the tire in the rim. Such distortion of the band has a tendency to contract the circle thereof, and thereby to tighten the tire in the rim. If maintained in this distorted condition while the tire is seated in the rim, the tension of the band serves to keep the wires pressed outward against the clencher flanges of the rim, thus making it practically impossible for the tire to be accidentally displaced from the rim. If the rim is made in sections, in the well known manner, the tightening of the rim by the drawing of the sections thereof together, or by securing the removable flange in place, after the tire is properly seated, will compress the base portion of the tire and thereby distort the retaining band in the manner explained. In any event, though, and regardless of whether the retaining band is maintained in a distorted condition while the tire is seated in the rim, the wires 6 have inner ends which engage the sides of said band, and the latter serves not only to keep the said wires pressed outward, but also to assist in keeping the tire seated in the rim. For, as explained, this retaining band is preferably of some suitable and permanently hard and tough material which is capable of withstanding considerable strain.

This application is a substitute for and continuation of my prior application No. 721,205, filed September 19, 1912.

What I claim as my invention is:—

1. In a vehicle wheel, the combination of a channel rim having side flanges, a resilient tire in said rim, a laterally flexible retaining member extending concentrically of the rim and tire, and means held in position by the pressure of said flanges for laterally flexing and distorting and retaining said member under tension in a manner tending to contract the circle thereof, thereby to tighten said tire on the rim, said band being flexible to permit said distortion when the tire is within said rim and to shift laterally to normal position when the tire is released.

2. An elastic tire having a tread and base of elastic rubber, a clencher channel, a central band of crimped steel, transverse wires spaced alternately at opposite sides of said band, their inner ends supported thereby and the outer ends being under the clencher portions of the said rim or channel, said band being distorted by the pressure of said channel against said transverse wires.

3. An elastic tire having a tread and base of elastic rubber, a clencher channel, a central band of fabric covered steel, transverse wires spaced alternately at opposite sides of said band, their inner ends supported thereby and the outer ends being under the clencher portions of said rim or channel, said band being distorted by the pressure of said channel against said transverse wire.

4. In a vehicle wheel, the combination of a channel rim having side flanges, a resilient tire in said rim, a laterally flexible retaining member extending concentrically of the rim and tire, and means held in position by the pressure of said flanges for laterally flexing and distorting and retaining said member in a manner tending to contract the circle thereof, thereby to tighten said tire on the rim, said means comprising elements disposed at intervals along said member and held in displaced positions by said flanges, said band being flexible to permit said distortion when the tire is within said rim and to shift laterally to normal position when the tire is released.

5. An elastic tire having a tread and base of elastic rubber, a clencher channel containing said base, a central band of flexible and relatively hard material in said base, transverse wires spaced alternately at opposite sides of said band, their inner ends supported thereby in position to cause lateral flexure of said band in opposite directions at intervals and the outer ends resting under and directly engaging the clencher portions of said rim or channel, the wires at one side being disposed centrally of the spaces between the wires at the other side, said band being distorted and held under tension in laterally displaced condition by flexion in opposite directions at intervals along the length thereof by the side pressure of said channel directly against the outer ends of said transverse wires.

Signed by me at Janesville, Wisconsin, this 29th day of April, 1915.

ALVARO S. KROTZ.

Witnesses:
F. H. FARNSWORTH,
H. E. MYHR.

Copies of this patent may be obtained for five cents each, by addressing the "Commissioner of Patents. Washington, D. C."